(12) United States Patent
Gurumurthi et al.

(10) Patent No.: US 11,763,155 B2
(45) Date of Patent: Sep. 19, 2023

(54) USING SUB-NETWORKS CREATED FROM NEURAL NETWORKS FOR PROCESSING COLOR IMAGES

(71) Applicant: Advanced Micro Devices, Inc., Santa Clara, CA (US)

(72) Inventors: Sudhanva Gurumurthi, Austin, TX (US); Abhinav Vishnu, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 856 days.

(21) Appl. No.: 16/538,764

(22) Filed: Aug. 12, 2019

(65) Prior Publication Data
US 2021/0049446 A1 Feb. 18, 2021

(51) Int. Cl.
| | |
|---|---|
| *G06N 3/04* | (2023.01) |
| *G06T 7/90* | (2017.01) |
| *G06N 20/20* | (2019.01) |
| *G06N 3/082* | (2023.01) |
| *G06N 3/045* | (2023.01) |
| *G06V 10/56* | (2022.01) |
| *G06V 10/82* | (2022.01) |
| *G06V 10/70* | (2022.01) |

(52) U.S. Cl.
CPC ............ *G06N 3/082* (2013.01); *G06N 3/045* (2023.01); *G06N 20/20* (2019.01); *G06T 7/90* (2017.01); *G06V 10/56* (2022.01); *G06V 10/82* (2022.01); *G06V 10/87* (2022.01)

(58) Field of Classification Search
CPC ......... G06N 3/0454; G06N 20/20; G06T 7/90
USPC .............................................. 706/15; 358/1.15
See application file for complete search history.

(56) References Cited

U.S. PATENT DOCUMENTS

2020/0160494 A1* 5/2020 Hwang .................... G06N 3/08

OTHER PUBLICATIONS

He et al., Channel Pruning for Accelerating Very Deep Neural Networks, eprint arXiv: 1707.06168, Jul. 2017, accessed on the Internet at https://arxiv.org/abs/1707.06168, last accessed Aug. 2019.
Luo et al., ThiNet: A Filter Level Pruning Method for Deep Neural Network Compression, eprint arXiv:1707.06342, Jul. 2017, accessed on the Internet at https://arxiv.org/abs/1707.06342, last accessed Aug. 2019.

(Continued)

*Primary Examiner* — Quang N Vo
(74) *Attorney, Agent, or Firm* — Park, Vaughan, Fleming & Dowler LLP

(57) ABSTRACT

A system comprising an electronic device that includes a processor is described. During operation, the processor acquires a full version of a neural network, the neural network including internal elements for processing instances of input image data having a set of color channels. The processor then generates, from the neural network, a set of sub-networks, each sub-network being a separate copy of the neural network with the internal elements for processing at least one of the color channels in instances of input image data removed, so that each sub-network is configured for processing a different set of one or more color channels in instances of input image data. The processor next provides the sub-networks for processing instances of input image data—and may itself use the sub-networks for processing instances of input image data.

20 Claims, 7 Drawing Sheets

(56) References Cited

OTHER PUBLICATIONS

Han et al., Learning both Weights and Connections for Efficient Neural Networks, eprint arXiv:1506.02626, Jun. 2015, accessed on the Internet at https://arxiv.org/abs/1506.02626, last accessed Aug. 2019.

Rastegari et al., XNOR-Net: ImageNet Classification Using Binary Convolutional Neural Networks, eprint arXiv:1603.05279, Mar. 2016, accessed on the Internet at https://arxiv.org/abs/1603.05279, last accessed Aug. 2019.

Guo et al., Dynamic Network Surgery for Efficient DNNs, eprint arXiv:1608.04493, Aug. 2016,, accessed on the Internet at https://arxiv.org/abs/1608.04493, last accessed Aug. 2019.

Tagarelli et al., Colour Blindness in Everyday Life and Car Driving, Acta Ophthalmol. Scand. 2004: 82: 436-442, Aug. 2004.

* cited by examiner

USING SUB-NETWORKS CREATED FROM NEURAL NETWORKS FOR PROCESSING COLOR IMAGES

BACKGROUND

Related Art

Some electronic devices perform operations for artificial neural networks or, more simply, "neural networks." Generally, a neural network is a computational structure that includes internal elements having similarities to biological neural networks, such as those associated with a living creature's brain. Neural networks can be trained to perform specified tasks by using known instances of training data to configure the internal elements of the neural network so that the neural network can perform the specified task on unknown instances of input data. For example, one task performed by neural networks is identifying whether (or not) an image includes image elements such as faces or vehicles. When training a neural network to perform image identification, images that are known to include (or not) the image element are processed through the neural network to configure the internal elements to generate appropriate outputs when subsequently processing unknown images to identify whether the image elements are present in the unknown images.

One type of neural network is a "fully connected" neural network. Fully connected neural networks include, in their internal elements, a set of artificial neurons, or "nodes," that are interconnected with one another in an arrangement having some similarity to how neurons are interconnected via synapses in a living creature's brain. A fully connected neural network can be visualized as a form of weighted graph structure in which the nodes include input nodes, intermediate nodes, and output nodes. FIG. 1 presents a block diagram illustrating a fully connected neural network 100 including input nodes 102, intermediate nodes 104 in layers 110 and 112, output nodes 106, and directed edges 108 (only two directed edges and layers are labeled for clarity). Within the fully connected neural network, each node other than output nodes 106 is connected to one or more downstream nodes via a directed edge that has an associated weight. During operation, input nodes 102 in a first layer of fully connected neural network 100 receive inputs from an external source and process the inputs to produce input values. Input nodes 102 forward the input values to intermediate nodes 104 in the next layer 110 of fully connected neural network 100. The receiving intermediate nodes 104 weight the received inputs based on a weight of a corresponding directed edge, i.e., adjust the received inputs such as multiplying by a weighting value, etc. Each intermediate node 104 sums the corresponding weighted received inputs and possibly a bias value to generate an internal value and evaluates an activation function for that intermediate node 104 using the internal value to produce a result value. Intermediate nodes 104 then forward the result values as input values to intermediate nodes 104 in the next layer 112 of fully connected neural network 100, where the input values are used to generate internal values and evaluate an activation function as described above. In this way, values progress through intermediate nodes 104 in layers of fully connected neural network 100 until a last layer of intermediate nodes 104 forward result values to output nodes 106 for fully connected neural network 100, which generate outputs for fully connected neural network 100. Continuing the example above, the outputs produced by output nodes 106—and thus from fully connected neural network 100—can be in a form, e.g., a number between 0-1, that indicates whether or not an image is likely to include (or not) a specified image element.

As described above, values forwarded along directed edges between nodes in a fully connected neural network (e.g., fully connected neural network 100) are weighted in accordance with a weight associated with each directed edge. By setting the weights associated with the directed edges during a training process so that desired outputs are generated by the fully connected neural network, the fully connected neural network can be trained to produce intended outputs such as the above-described identification of image elements in images. When training a fully connected neural network, numerous instances of training data having expected outputs are processed in the fully connected neural network to produce actual outputs from the output nodes. Continuing the example above, the instances of training data would include digital images that are known to include (or not) particular image elements, and thus for which the fully connected neural network is expected to produce outputs that indicate that the image element is likely present (or not) in the images. After each instance of training data is processed in the fully connected neural network to produce an actual output, an error value, or "loss," between the actual output and a corresponding expected output is calculated using mean squared error, log loss, or another algorithm. The loss is then worked backward through the fully connected neural network, or "backpropagated" through the fully connected neural network, and used to adjust the weights associated with the directed edges in the fully connected neural network in order to reduce the error for the instance of training data. The backpropagation operation adjusts the fully connected neural network's response for that particular instance of training data and all subsequent instances of input data. For example, one backpropagation technique, which can be called gradient descent, involves computing a gradient of the loss with respect to the weight for each directed edge in the fully connected neural network. Each gradient is then multiplied by a training coefficient or "learning rate" to compute a weight adjustment value. The weight adjustment value is next used in calculating an updated value for the corresponding weight, e.g., added to an existing value for the corresponding weight.

Another type of neural network is a convolutional neural network. FIG. 2 presents a block diagram illustrating convolutional neural network 200. As can be seen in FIG. 2, the internal elements of convolutional neural network 200 can be grouped into feature processing elements 202 and classification elements 204. Feature processing elements 202 process features in instances of input data 216 (e.g., digital images, digital audio recordings, etc.) in preparation for the classification of the features in classification elements 204. Feature processing elements 202 include internal elements for convolution, normalizing, and pooling. In the convolution 208 internal elements, a set of filters are used to generate feature maps from instances of input data. The feature maps are then normalized (e.g., using rectified linear units) in the normalizing 210 internal elements. After being processed in the normalizing 210 internal elements, the feature maps are further processed (e.g., subsampled, downsampled, etc.) in the pooling 212 internal elements to generate reduced-dimension feature maps. Flattening 214 internal elements next prepare the reduced-dimension feature maps from the pooling 212 internal elements for input into the fully connected 206 internal elements. Classification elements 204 include a fully connected 206 neural network as described above that classifies inputs (i.e., flattened reduced-dimension feature maps) as including specified elements (or not) and produces outputs 218 representing the classification. As with the fully connected neural network, backpropagation (i.e., gradient descent, etc.) can be used to train the convolution 208 internal elements by adjusting values in the set of filters and possibly other values in the internal elements of feature processing elements 202.

The examples of the fully connected and convolutional neural network shown in FIGS. 1 and 2 are simplified. In almost all cases, fully connected neural networks include many more layers and/or nodes. In practice, fully connected neural networks for many applications can have millions of nodes arranged in large numbers of layers. In addition, the feature processing elements for convolutional neural networks often have multiple/repeated layers of convolution, normalizing, and pooling internal elements. The examples in FIGS. 1 and 2 are also generic; fully connected and/or convolutional neural networks may include different arrangements of internal elements and/or internal elements that are not shown in FIGS. 1-2. Generally, processing instances of input data through a fully connected or convolutional neural network involves a large number of internal elements—and is therefore computationally intensive.

As described above, using neural networks to process instances of input data is computationally intensive due to the computations that are performed in the various internal elements. The computational intensity increases in cases where redundancy is employed, such as in automotive, avionic, or commercial image processing applications, where redundancy is used for safety and correctness. For example, some systems are N-modulo redundant, and thus a neural network is duplicated N times within the system. In operation, each instance of input data is processed through each of the N neural networks and the outputs generated by each of the N neural network are compared to one another to ensure a match. In such a system, in comparison to a system with only a single neural network, the computational intensity can be increased by a factor of more than N. Providing an adequate level of safety and correctness in such systems while reducing the computational intensity for processing instances of input data through neural networks is desirable.

BRIEF DESCRIPTION OF THE FIGURES

Throughout the figures and the description, like reference numerals refer to the same figure elements.

DETAILED DESCRIPTION

Figure 1:
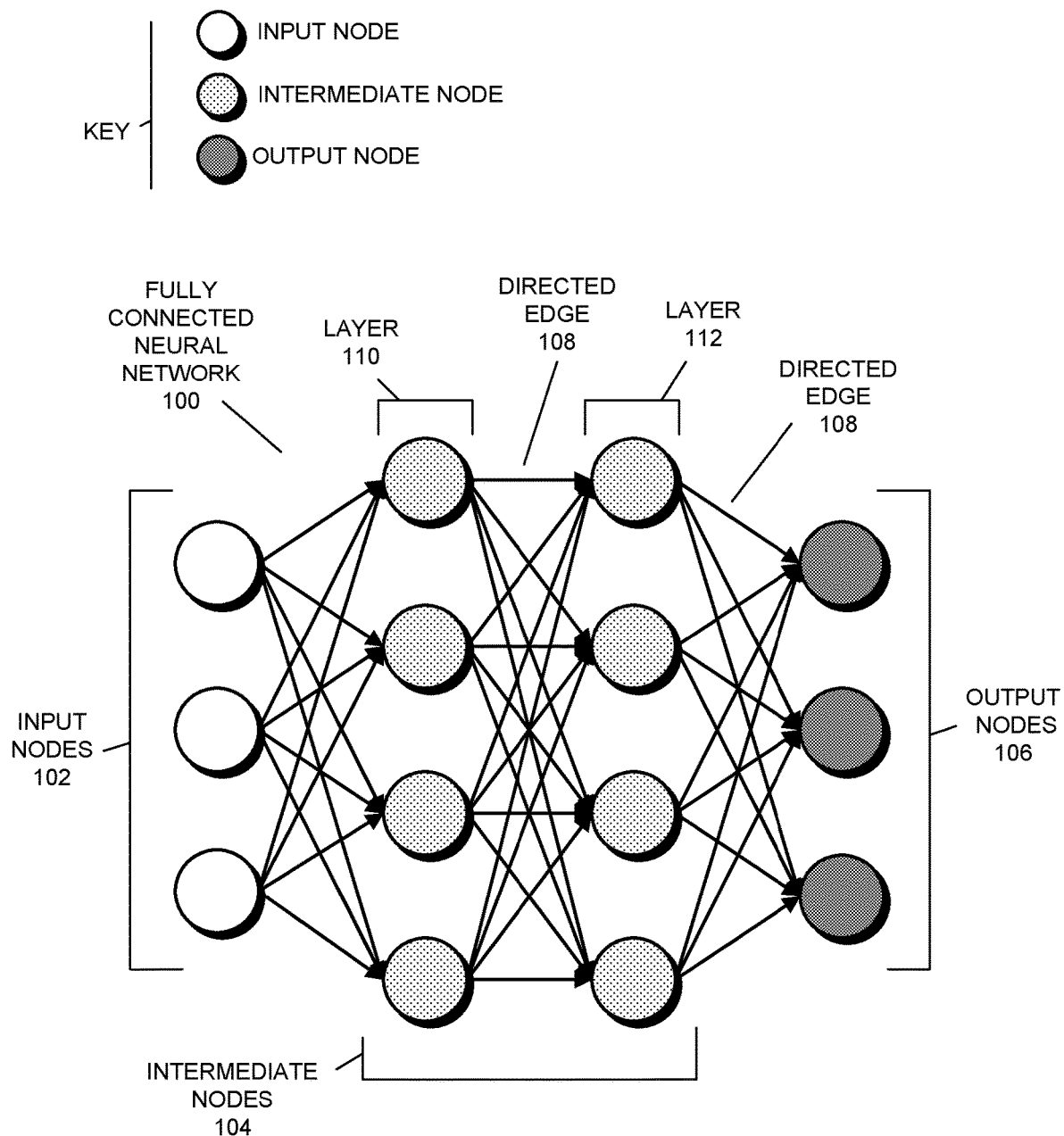
FIG. 1 presents a block diagram illustrating a fully connected neural network.
Figure 2:
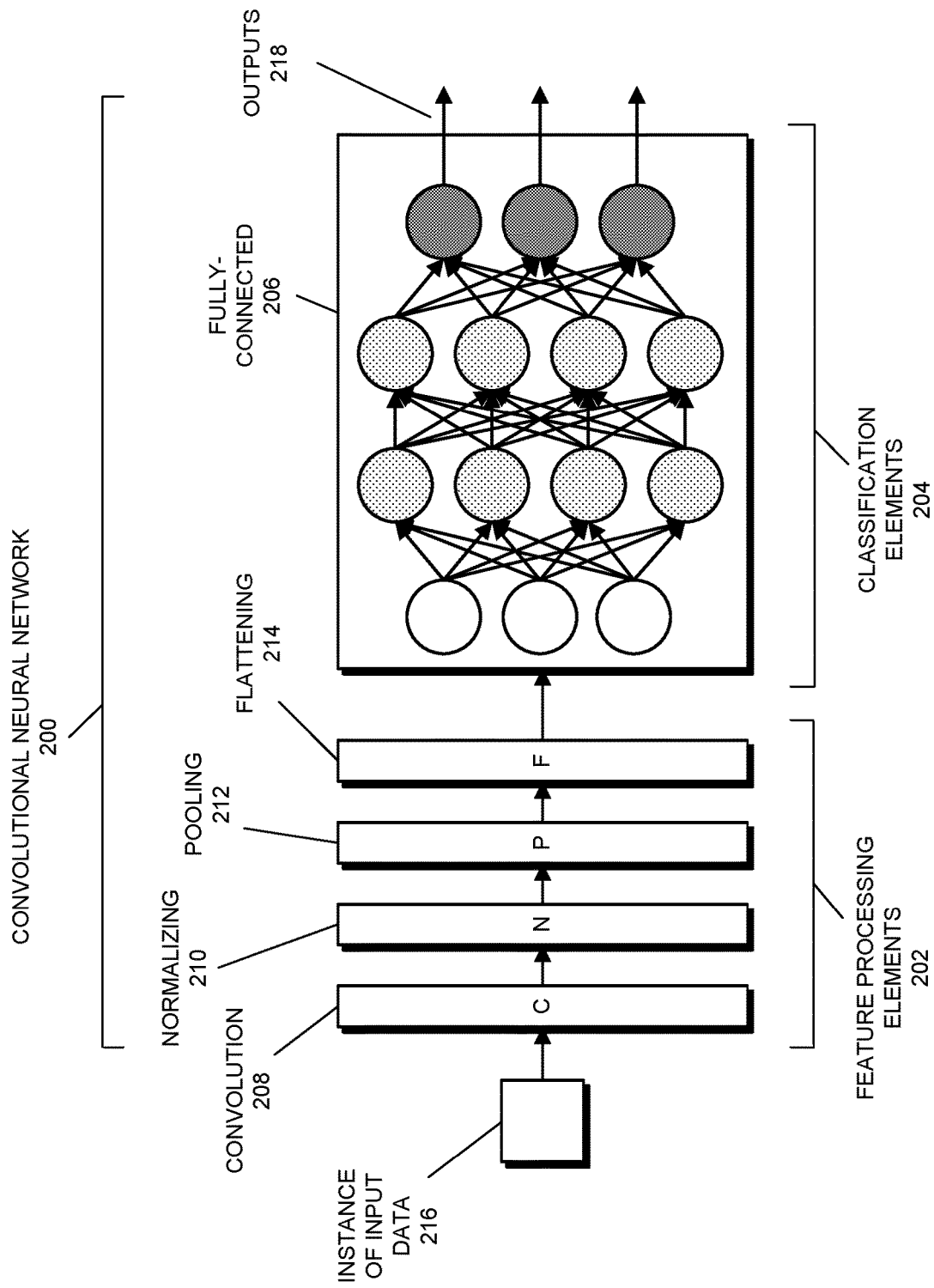
FIG. 2 presents a block diagram illustrating a convolutional neural network.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that this term may have significant additional aspects that are not recited herein for clarity and brevity and thus the description is not intended to limit the term.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element and/or a common clock, etc. A functional block can include any number of circuit elements, from a single circuit element (e.g., a single integrated circuit logic gate) to millions or billions of circuit elements (e.g., an integrated circuit memory).

Neural Network

As described above, a neural network is a computational structure that includes internal elements that are trained to perform specified tasks. In the described embodiments, sub-networks generated from full versions of neural networks are used for classifying color images, e.g., for identifying image elements, events, etc. using individual color images or sequences thereof. Generally, the described embodiments can generate sub-networks from full versions of any type or form of neural network or combination thereof that has internal elements for processing color channel information that can be removed in order to create the sub-networks. For example, in some embodiments, the full version of the neural network is or includes a fully connected neural network. As another example, in some embodiments, the full version of the neural network is or includes a convolutional network. As yet other examples, in some embodiments, the full version of the neural network is or includes some or all of recurrent neural networks, auto encoders, Markov chains, belief networks, and residual networks. The various types and forms of neural networks are generally known in the art and/or are described above, and are therefore not described in detail for clarity and brevity.

Overview

In the described embodiments, an electronic device performs operations for processing color images, where "color" images are defined via color channel information for a set of color channels. For example, in some embodiments, each color image includes or is defined by a set of pixels, each pixel having color channel information (e.g., a set of 24, 32, or another number of bits) for an arrangement of N color channels such as red-green-blue (RGB), cyan-magenta-yellow-key (CMYK), etc. In the described embodiments, the electronic device uses a neural network for processing the color images. For example, the electronic device may use a neural network such as a fully connected neural network or a convolutional neural network to process a sequence of one or more color images from a digital camera or other source to determine if specified image elements are present, if an event has occurred, etc. Based on the observation that full color information is not necessary (or even available) for processing color images in some cases, the electronic device in the described embodiments uses reduced versions of full versions of neural networks to improve the efficiency of processing the color images. The reduced versions of the full version of the neural network, called "sub-networks" herein, are separate copies of the full version of the neural network which have had internal elements for processing one or more of the color channels removed. The sub-networks are used alone or in combination for processing the color images, as described in more detail below.

In the described embodiments, an electronic device generates sub-networks from a full version of a neural network for processing color images. In preparation for generating the sub-networks, the electronic device acquires the full version of the neural network. For example, the processor may retrieve a representation of the full version of the neural network, possibly created by a different electronic device, from a storage medium or via a network, may create the full version of the neural network itself, etc. The electronic device then generates the sub-networks from the acquired full version of a neural network. As described above, each sub-network is a separate copy of the full version of the neural network from which internal elements for processing a respective at least one of the color channels of the color images have been removed. Generating each sub-network includes pruning, from a copy of the full version of the neural network, internal elements such as filters, nodes, weights or weighted edges, etc. that are associated with the at least one of the color channels. For example, in some embodiments, the pruning includes, starting from each input of the neural network that receives color image information associated with a given color channel (e.g., specified bits from one or more color pixels, etc.), removing internal elements that receive inputs associated with or based on the given color channel. Note that "removing" internal elements as described herein can mean actually removing the internal elements—i.e., deleting the internal elements from the neural network and modifying the neural network to operate without the internal elements—but the described embodiments are not limited to the actual removal of internal elements. In some embodiments, the "removal" of internal elements includes removing, from internal elements, the dependency on data from given color channel(s), so that the internal elements no longer operate on/use inputs associated with or based on the given color channel(s)—but the internal elements may otherwise remain in the neural network and operate on data from other color channels. After generating the sub-networks, the electronic device provides the sub-networks to the electronic device itself and/or to other electronic devices.

In the described embodiments, the color images have N color channels, i.e., are defined using information for each of the N color channels, and thus the full version of the neural network for processing the color images includes internal elements for processing N color channels. As described above, the sub-networks have the internal elements for processing at least one of the N color channels removed. For example, in some embodiments where the color channels are red (R), green (G), and blue (B), the sub-networks include some or all of: an RG sub-network (from which the internal elements for processing the B color channel have been removed); an RB sub-network; a GB sub-network; an R sub-network (from which the internal elements for processing the B and G color channel have been removed); a B sub-network; and a G sub-network.

In some embodiments, individual sub-networks can be used alone for processing color images in situations in which color channel data is unnecessary or unavailable, when computational efficiency is desired (and sufficiently accurate results can be achieved with a single sub-network), etc. For example, when image elements (e.g., traffic lights, road signs, etc. in images from vehicle cameras) can be identified using a subset of the color channels (such as may be done in the real world by colorblind people), a corresponding sub-network for processing the subset of the color channels can be selected and used for processing the color images. For instance, in some embodiments, when the above-described red (R) color channel from among the RGB color channels is determined to be unneeded or unavailable (e.g., given a partial failure of a digital camera that supplies the color images, corruption of an input image file, etc.), additional computational efficiency is desired, etc., and thus the green and blue color channels are to be processed, the GB sub-network, the G sub-network, or the B sub-network can be selected and used alone for processing color images.

In some embodiments, two or more sub-networks can be used together for processing color images. For example, in some embodiments, two or more of the sub-networks are combined to create an "ensemble" network. For an ensemble network, instances of input image data are separately processed through each of the sub-networks to generate internal outputs for the ensemble network—i.e., a separate output is generated for each of the sub-networks. An overall output of the ensemble network is then computed as a function (e.g., an average, etc.) of the outputs of the sub-networks. In some of these embodiments, the combination of sub-networks is sufficient to process/account for all N color channels, despite the individual sub-networks missing at least some of the internal elements for processing all N color channels. Continuing the example above for the RGB color channels, the RG and RB sub-networks, when used in an ensemble network, include sufficient internal elements to process/account for all three color channels, despite the sub-networks each missing internal elements for processing a different one of the color channels. Although such an ensemble network does not have the same redundancy as processing images using copies of the full version of neural networks, the sub-networks can be smaller and less complex, which avoids some of the computational intensity (again, electrical power consumption, memory system bandwidth, etc.) of existing electronic devices while accounting to at least some extent for each color channel.

In some embodiments, after generating the sub-networks, the electronic device "provides" the sub-networks, i.e., makes the sub-networks available for subsequent image processing operations for one or more electronic devices. In some embodiments, the electronic device provides the sub-networks to itself—i.e., to processors therein (which can be different processors than those that generated the sub-networks). In these embodiments, the electronic device stores the sub-networks in a memory or other storage medium and then retrieves and uses the sub-networks for processing color images. In some embodiments, the electronic device provides the sub-networks to other electronic devices, such as remote devices via a network, removable storage media, etc. In these embodiments, when the electronic device provides the sub-networks to the other electronic devices, the electronic device stores representations of the sub-networks themselves (e.g., a file that lists neural network internal element properties and characteristics) and/or combinations thereof (e.g., ensemble networks created from two or more sub-networks) in a storage medium or otherwise communicates the representations of the sub-networks to other electronic devices. The other electronic devices retrieve or acquire the representations of the sub-networks and then use the sub-networks or combinations thereof for processing color images. In some embodiments, the other electronic devices retrieve the individual sub-networks and locally create ensemble networks as needed (and therefore may not rely on the electronic device for creating ensemble networks).

By using the sub-networks for processing color images, the described embodiments reduce the computational intensity of processing color images. In other words, the described embodiments achieve at least some benefits of using neural networks for processing instances of input image data (i.e., the recognition of image elements, events, etc.), but avoid the consumption of electrical power, memory system bandwidth, and computational processing that is involved in using full versions of neural networks for processing color images such as in existing systems. In contrast to existing systems, therefore, the described embodiments operate more efficiently, which leads to higher user satisfaction.

System

Figure 3:
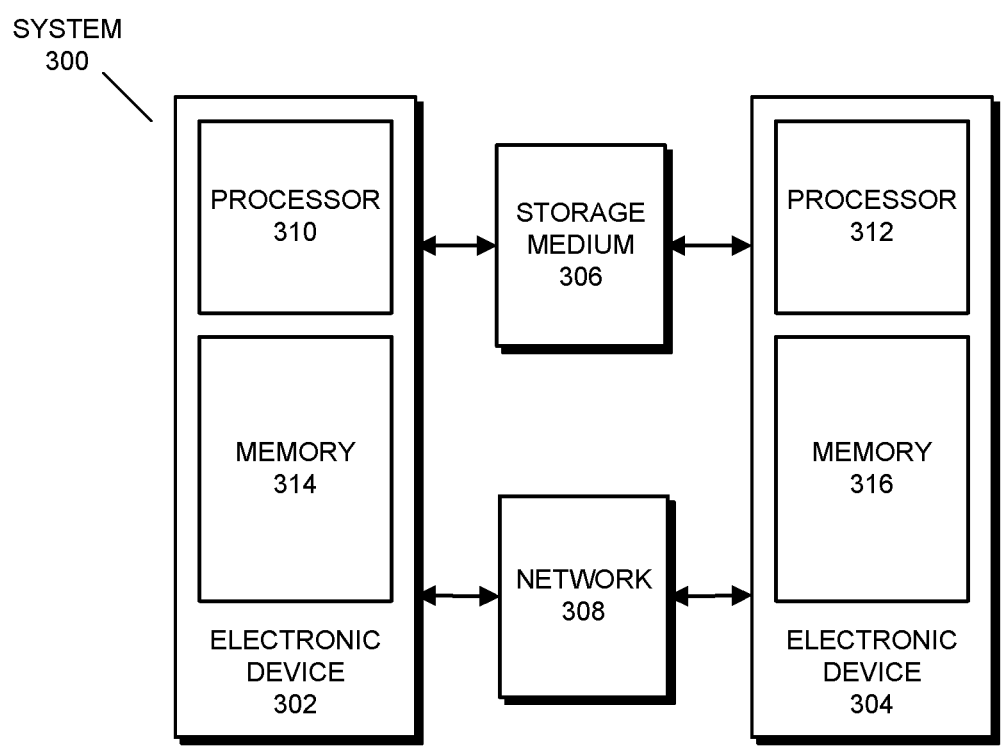
FIG. 3 presents a block diagram illustrating a system in accordance with some embodiments.

In the described embodiments, a system performs operations for, among other things, generating sub-networks from full versions of neural networks and using the sub-networks for processing color images. FIG. 3 presents a block diagram illustrating system 300 in accordance with some embodiments. As can be seen in FIG. 3, system 300 includes electronic devices 302-304, storage medium 306, and network 308.

Each of electronic devices 302-304 is or includes one or more of a server computer, a desktop computer, a laptop computer, a wearable computing device, a tablet computer, a piece of virtual or augmented reality equipment, a smart phone, an artificial intelligence (AI) or machine learning accelerator, a network appliance, a toy, a piece of audio-visual equipment, a home appliance, a vehicle controller, etc. Electronic devices 302-304 may be the same type of electronic device or different types of electronic devices. For example, in some embodiments, electronic device 302 is a server computer that generates, from full versions of neural networks, sub-networks, and electronic device 304 is a controller in a vehicle that acquires and uses the sub-networks for processing instances of image data such as frames from a camera on the vehicle.

Each of electronic devices 302-304 includes, respectively, a processor 310-312 and a memory 314-316. Each of processors 310-312 is a functional block that performs computational and other operations in the respective electronic device 302-304. For example, processors 310-312 may be or include one or more central processing unit (CPU) cores, graphics processing unit (GPU) cores, application specific integrated circuits (ASICs), field programmable gate arrays (FPGAs), neural network accelerators or processors, etc. In some embodiments, each processor 310-312 includes circuit elements or functional blocks such as pipelines, execution units, compute units, etc. that execute program code that causes the circuit elements/functional blocks to perform various operations. In some embodiments, each processor 310-312 includes hardware circuits that are dedicated to—and possibly purpose-specific for—performing specified operations.

Each of memories 314-316 is a functional block that performs operations of a memory (e.g., a computer readable storage medium "main" memory) for that electronic device. Memories 314-316 include memory circuits such as fourth-generation double data rate synchronous dynamic random access memory (DDR4 SDRAM), static random access memory (SRAM), and/or other types of memory circuits for storing data and instructions for use by functional blocks in the respective electronic device 302-304 and control circuits for handling accesses of the data and instructions that are stored in the memory circuits and for performing other control or configuration operations. In some embodiments, information about neural networks (e.g., representations of sub-networks, etc.), instances of input image data, neural network results, etc. are stored in and retrieved from one or both of memories 314-316.

Storage medium 306 is a computer-readable storage medium such as a memory, a disk or higher capacity non-volatile semiconductor memory, and/or a removable storage medium (e.g., a USB flash drive, DVD, etc.) that is used for storing data and information for the operations herein described. For example, in some embodiments, storage medium 306 is used for storing information about neural networks (e.g., representations of sub-networks, etc.), instances of input image data, and/or other data or information.

Network 308 is an electronic communications network that includes signal routes (i.e., buses, wires, guides, wireless signal routes, etc.) and/or functional blocks (i.e., controllers, routers, switches, etc.) that are used for communicating data and information between electronic devices 302-304. For example, network 308 can be or include one or more wired or wireless networks such as an Ethernet networking system, the Internet, a Bluetooth network, a cellular network (e.g., a 5G/4G network such as UMTS, LTE, etc.), a universal serial bus (USB) network, a network based on the standards described in IEEE 802.11 (e.g., a Wi-Fi network), an I2C or inter-processor communication network, and/or another network.

Processors 310-312, memories 314-316, storage medium 306, and network 308 are implemented in hardware, i.e., using various functional blocks, circuit elements, and devices. For example, processors 310-312, memories 314-316, storage medium 306, and network 308 can each be entirely fabricated on one or more semiconductor chips, including on one or more separate semiconductor chips, can be fashioned from semiconductor chips in combination with discrete circuit elements, can be fabricated from discrete circuit elements alone, etc.

Although system 300 is shown as including particular arrangement of devices and functional blocks, system 300 is simplified for illustrative purposes. In some embodiments, system 300 includes additional or different devices and/or functional blocks—or is itself included in a device that has additional or different functional blocks, subsystems, and/or circuit elements. In addition, although electronic devices 302-304 are shown with particular and simplified functional blocks, in some embodiments, one or both of electronic devices 302-304 includes a different arrangement of functional blocks such as display subsystems, power subsystems, input-output (I/O) subsystems, etc. Generally, system 300 and electronic devices 302-304 include sufficient functional blocks, etc. to perform the operations herein described.

Sub-Networks

Figure 4:
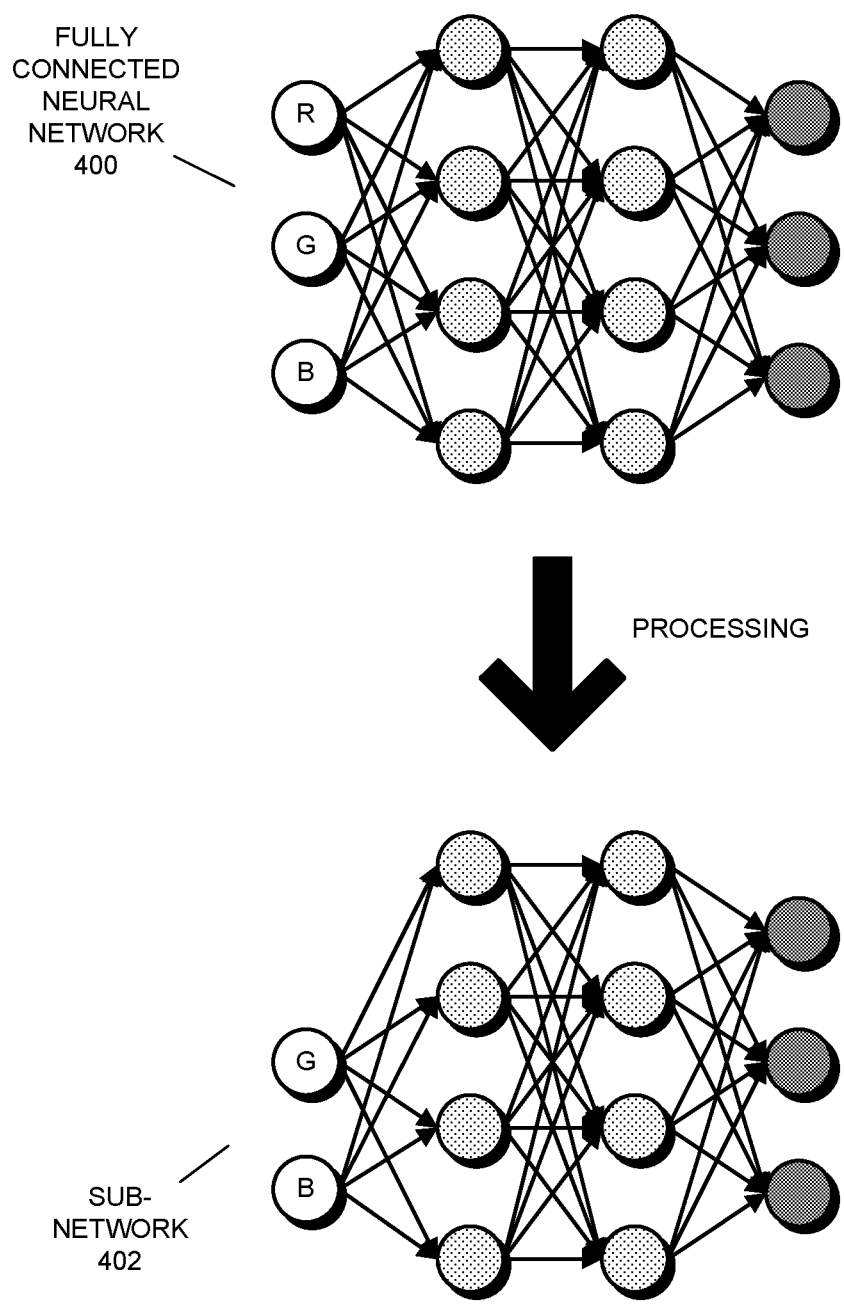
FIG. 4 presents a block diagram illustrating the generation of a sub-network from a full version of a neural network in accordance with some embodiments.

In the described embodiments, an electronic device (e.g., electronic device 302 and/or 304) generates, from full versions of neural networks, sub-networks. Each sub-network is a copy of a full version of a neural network from which internal elements for processing a color channel have been removed (or "pruned"). FIG. 4 presents a block diagram illustrating the generation of a sub-network from a full version of a neural network in accordance with some embodiments. As shown by the labels on the input nodes of fully connected neural network 400, fully connected neural network 400 includes a separate input node that receives color channel information (e.g., a number of bits) for each of color channels R, G, and B. For example, the input nodes shown in FIG. 4 may receive color channel information from a single pixel or group thereof in a color image—and may be part of a larger neural network that receives color channel information from other pixels in the color image. From the input nodes, the color channel information feeds into intermediate nodes and is eventually used to generate outputs from output nodes of fully connected neural network 400 as described above.

As can be seen in FIG. 4, the electronic device processes (as shown by the downward arrow) fully connected neural network 400 to generate sub-network 402. During the processing, internal elements for processing the color channel red (R), i.e., from the top input node, are removed from a copy of fully connected neural network 400. For example, in some embodiments, the electronic device proceeds, from an input node or input at which color channel information for the R color channel is received (i.e., enters the neural network), along paths through the neural network, removing and/or reconfiguring internal elements as needed. For the example in FIG. 4, this process leads to sub-network 402, which lacks the R input node and the directed edges proceeding therefrom from fully connected neural network 400. Because the R input node is removed, the computational intensity of sub-network 402 is reduced relative to fully connected neural network 400. In other words, less computational effort is required for generating the outputs from the output nodes because the R input node and directed edges have been removed.

Although a particular neural network (i.e., a simplified fully connected neural network) is presented as an example in FIG. 4, in some embodiments, a different type or form of neural network is used. For example, a larger and more complex fully connected neural network, a convolutional neural network, and/or another type or form of neural network may be used. Generally, the described embodiments can generate sub-networks from any type or form of neural network for which it is possible to discern/determine and remove internal elements used for processing color channel information within the neural network while retaining sufficient accuracy for the remaining color channels. In addition, although the RGB color channels are used as an example in FIG. 4, the described embodiments are operable with any number and/or arrangement of color channels, including cyan-magenta-yellow-key (CMYK), etc.

In some embodiments, color channel information and/or intermediate results based thereon penetrate further into the neural network without being intermixed with other color channel information or results based thereon (which happens in the first intermediate layer in FIG. 4). In these embodiments, directed edges, intermediate nodes, and/or result nodes may be removed from the neural network—and thus the sub-network may retain relatively less structure from the full version of the neural network. In addition, neural networks such as convolutional neural networks, which have convolutional, normalizing, and pooling layers, among other types of layers, may have these layers reduced in size or complexity and/or removed based on whether the layers are used for processing specified color channel information.

Removing internal elements as described herein can mean actually removing the internal elements—i.e., deleting the internal elements from the neural network and modifying the neural network to operate without the internal elements. The described embodiments are not, however, limited to the actual removal of internal elements. In some embodiments, the "removal" of internal elements includes removing, from internal elements, the dependency on data from given color channel(s), so that the internal elements no longer operate on/use inputs associated with or based on the given color channel(s)—but the internal elements may otherwise remain in the neural network and operate on data from other color channels. This is shown in FIG. 4 in that the first layer of intermediate nodes does not receive inputs from the (removed) R input node, but remain in the neural network—and receive and process inputs from the G and B input nodes.

In some embodiments, generating the sub-network includes reconfiguring and/or retraining the sub-network in order to update values in the neural network. For example, when directed edges and/or intermediate nodes are removed, the overall flow and balance of the neural network changes (with respect to the original full version of the neural network). The processor that removes the internal elements may also therefore reconfigure connections to nodes, such as by re-routing directed edges within the neural network, etc. The particular reconfiguring and/or retraining that is performed depends on the type or form of neural network upon which the operations are performed. For example, the reconfiguration and/or retraining for a sub-network of a convolutional neural network can include adding or changing convolutional layers or filters, adding or changing pooling layers or parameters, etc.

Processes for Generating and Using Sub-Networks

Figure 5:
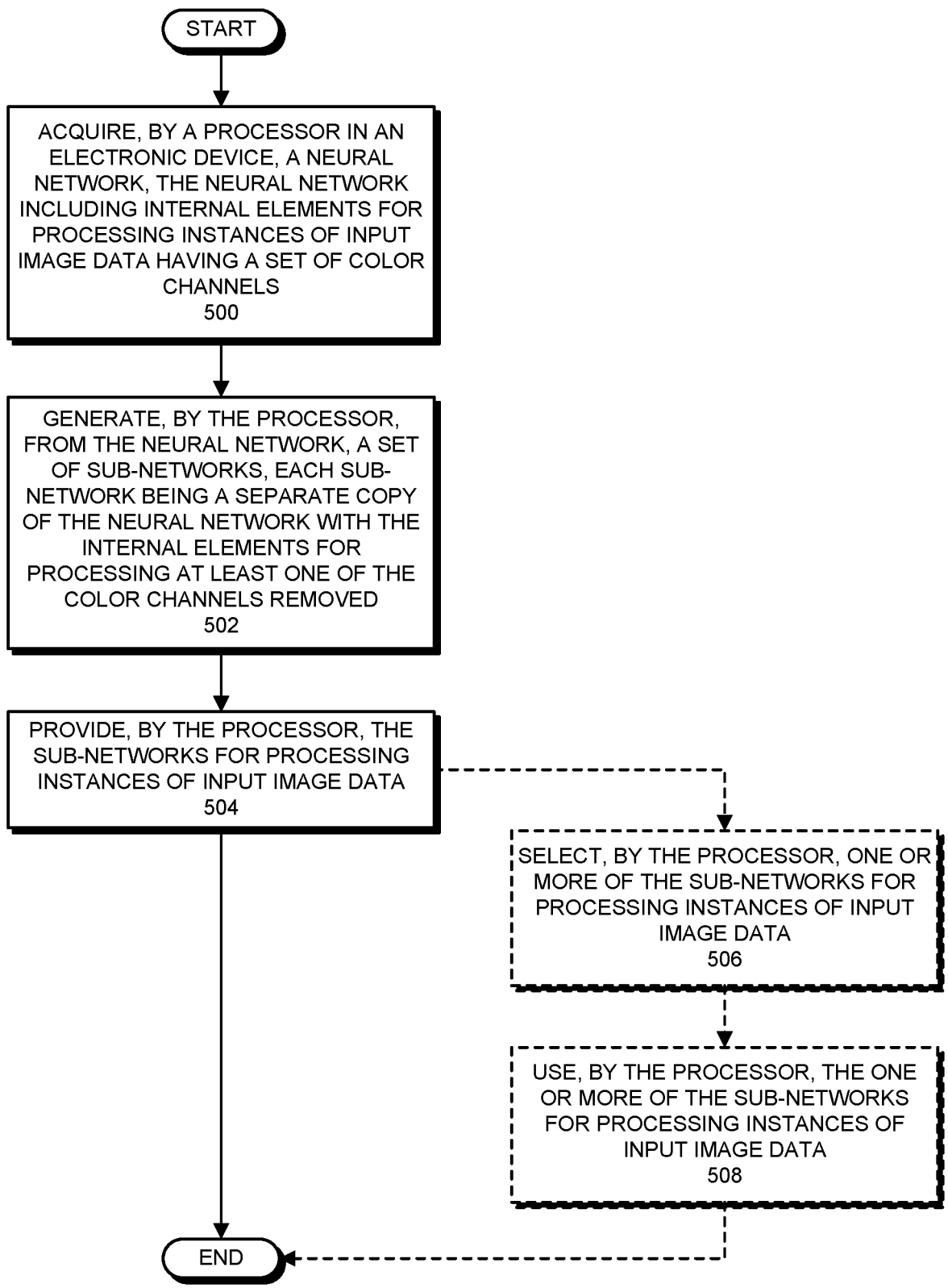
FIG. 5 presents a flowchart illustrating a process for generating and using sub-networks in accordance with some embodiments.

In the described embodiments, a processor generates, from full versions of neural networks, sub-networks to be used for processing instances of input image data. FIG. 5 presents a flowchart illustrating a process for generating and using sub-networks in accordance with some embodiments. Note that the operations shown in FIG. 5 are presented as a general example of operations performed by some embodiments. The operations performed by other embodiments include different operations, operations that are performed in a different order, and/or operations that are performed by different entities or functional blocks.

The process in FIG. 5 starts when a processor in an electronic device (e.g., processor 310 in electronic device 302) acquires a neural network that includes internal elements for processing instances of input image data having a set of color channels (step 500). When acquiring the neural network, the processor retrieves a representation of the neural network from a storage medium (e.g., memory 314, storage medium 306, etc.), receives the representation of the neural network via a network (e.g., network 308), and/or otherwise acquires the representation of the neural network. The "representation" of the neural network includes information identifying the type, form, elements, arrangement, connectivity, and/or other properties and characteristics of the neural network. For example, in some embodiments, the representation of the neural network is included in a file, stream of data, and/or another format as a listing of the properties and characteristics of the neural network. In some embodiments, the acquired neural network is a full version of a neural network that is prepared (i.e., previously arranged and trained) for processing input image data having N color channels. For example, the full version of the neural network may similar to the full versions of neural networks used in existing systems for processing color images.

The processor then generates, from the neural network, a set of sub-networks, each sub-network being a separate copy of the neural network with the internal elements for processing at least one of the color channels removed (step 502). For this operation, the processor generates, from the full version of the neural network, sub-networks for each specified combination of color channels from among a set of color channels. For example, in some embodiments, when the full version of the neural network is prepared for processing CMYK color channels, four sub-networks are generated, each sub-network having internal elements for processing a single one of the color channels—i.e., C, M, Y, and K sub-networks. In other words, and using the C sub-network as an example, the M, Y, and K internal elements are removed from a copy of the full version of the neural network to generate the C sub-network. As another example, and continuing the CMYK example, four sub-networks may be generated, each sub-network having internal elements for processing a different group of three of the four color channels (i.e., MYK, CYK, CMK, and CMY).

In the described embodiments, the internal elements that are removed in step 502 depend on the type and form of the neural network. For example, for a fully connected neural network, internal elements such as directed edges, weights, bias values, input nodes, intermediate nodes, and output nodes can be removed. As another example, for a convolutional neural network, internal elements such as convolutional layers or portions thereof, filters, normalizing layers or portions thereof, pooling layers, sampling mechanisms, directed edges, weights, bias values, input nodes, intermediate nodes, and output nodes can be removed. Recall that "removing" internal elements from neural networks as used herein indicates that the internal elements for processing a given color channel can be either be deleted from the neural network or the dependency on data from given color channel(s) can be removed from the internal elements, so that the internal elements no longer operate on/use inputs associated with or based on the given color channel(s).

Following the removal of internal elements, in some embodiments, the sub-network is reconfigured and/or retrained to operate without the internal elements. For example, for retraining the sub-network, a number (and possibly a large number) of instances of input image data may be processed in a sub-network to generate outputs from the sub-network. From the outputs, losses or errors may be determined and backpropagated through the sub-network in order to adjust values for or associated with internal elements. Generally, generating the sub-networks includes ensuring that the sub-networks are prepared for processing instances of input image data having corresponding color channel information.

The processor then provides the sub-networks for processing instances of input image data (step 504). During this operation, the processor makes the sub-networks available to entities such as the processor itself, other functional blocks in the same electronic device, and/or other electronic devices (e.g., electronic device 304, etc.). For example, the processor may store, in a remote or local memory (e.g., memory 314, storage medium 306, etc.) representations of some or all of the sub-networks. As another example, the processor may stream or otherwise make representations of some or all of the sub-networks available via network 308. For instance, in some embodiments, electronic device 302 is a node in a multi-node computing device (e.g., a server computer) and supplies the representations of some or all of the sub-networks to one or more other nodes via an inter-node communication network.

As described above, in some embodiments, the processor provides the sub-networks to the processor itself—and thus the electronic device can use the sub-networks that the electronic device generated. For example, the processor may store representations of some or all of the sub-networks in a local memory (e.g., memory 314), from where the representations may be subsequently retrieved by the processor and used for processing instances of input image data. Operations for the processor itself using the sub-networks are shown using dashed lines in FIG. 5 to indicate that these operations are optional—and may only be performed in some embodiments. These operations start when the processor selects one or more of the sub-networks for processing instances of input image data (step 506). For this operation, based on color channel information that is to be processed, the processor selects the one or more of the sub-networks. For example, when color images using the CMYK color channels are being processed and the sub-networks include the MYK, CYK, CMK, and CMY sub-networks, assuming that the processor is to process instances of image data without using the C color channel, the processor selects the MYK sub-network. The processor then uses the one or more of the sub-networks for processing instances of input image data (step 508). Using each sub-network to process instances of input image data includes processing each instance of input image data through the sub-network to generate outputs indicating, e.g., whether certain image elements are present in the instances of input image data, whether an event or action has occurred for in sequences of one or more instances of input image data, etc. For example, when the instances of input data are frames of video from a camera on a vehicle such as a car or truck, using the sub-networks to process the instances of input image data may include determining if a road sign, traffic light or traffic light state, and/or another vehicle is shown in sequences of one or more frames of video.

Figure 6:
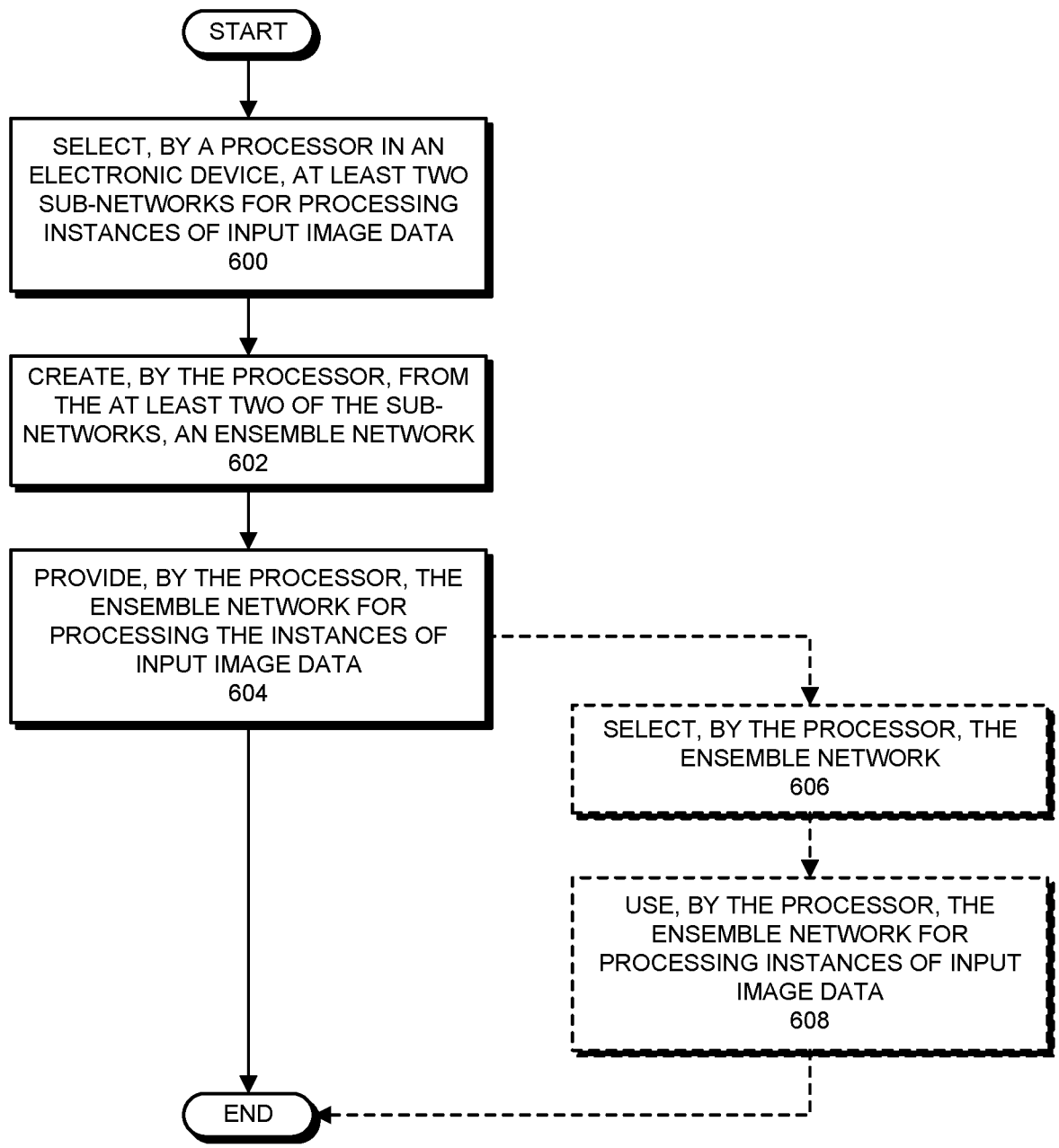
FIG. 6 presents a flowchart illustrating a process for generating and using an ensemble network in accordance with some embodiments.

For the example in FIG. 5, a processor generates individual sub-networks to be used for processing instances of input image data. In some embodiments, however, the processor also (or alternatively) generates "ensemble" networks, which are combinations of two or more of the individual sub-networks to be used for processing instances of input image data. FIG. 6 presents a flowchart illustrating a process for generating and using an ensemble network in accordance with some embodiments. Note that the operations shown in FIG. 6 are presented as a general example of operations performed by some embodiments. The operations performed by other embodiments include different operations, operations that are performed in a different order, and/or operations that are performed by different entities or functional blocks. In addition, the operations shown in FIG. 6 are performed after the generation of sub-networks from a full version of a neural network. For example, the processor may have performed steps 500-502 of FIG. 5 prior to performing the operations shown in FIG. 6.

The process in FIG. 6 starts when the processor selects at least two sub-networks for processing instances of input image data (step 600). During this operation, the processor chooses the sub-networks that are to be incorporated into the ensemble network. For example, the processor may choose the sub-networks in accordance with a configuration file or specified set of ensemble networks, based on a request for given ensemble networks from a software application, based on color channels available or to be processed in particular instances of input image data, etc. For instance, when color images using the RGB color channels are being processed and the sub-networks include the RG, GB, and RB sub-networks, the processor may select the RG and RB sub-networks so that each of the color channels is processed in the ensemble network.

The processor then creates, from the at least two of the sub-networks, the ensemble network (step 602). Creating the ensemble network includes combining the chosen sub-networks into a neural network that produces a unified output, such as by computing a unified output as a function (e.g., average, maximum, etc.) of the outputs of the component sub-networks within the ensemble network. In some embodiments, during this operation, the processor wraps or otherwise includes the sub-networks within new ensemble network elements such as instance of input image data processing/forwarding elements, output computation elements, etc. In other words, following step 602, the ensemble network is a standalone neural network that can be used to process instances of input image data through the component sub-networks and produce a unified output.

The processor then provides the ensemble network for processing instances of input image data (step 604). During this operation, the processor makes the ensemble network available to entities such as the processor itself, other functional blocks in the same electronic device, and/or other electronic devices (e.g., electronic device 304, etc.). For example, the processor may store, in a remote or local memory (e.g., memory 314, storage medium 306, etc.) representations of the ensemble network. As another example, the processor may stream or otherwise make representations of the ensemble network available via network 308. For instance, in some embodiments, electronic device 302 is a node in a multi-node computing device (e.g., a server computer) and supplies the representations of the ensemble network to one or more other nodes via an inter-node communication network. Note that a "representation" of an ensemble network includes information identifying the type, form, elements, arrangement, connectivity, and/or other properties and characteristics of the ensemble network. For example, in some embodiments, a representation of an ensemble network is included in a file, stream of data, and/or another format as a listing of the properties and characteristics of the ensemble network.

As described above, in some embodiments, the processor provides the ensemble network to the processor itself—and thus the electronic device can use the ensemble network that the electronic device generated. For example, the processor may store representations of the ensemble network in a local memory (e.g., memory 314), from where the representations may be subsequently retrieved by the processor and used for processing instances of input image data. Operations for the processor itself using the ensemble network are shown using dashed lines in FIG. 6 to indicate that these operations are optional—and may only be performed in some embodiments. These operations start when the processor selects the ensemble network for processing instances of input image data (step 606). For this operation, based on color channel information that is to be processed, the processor selects the ensemble network. The processor then uses the ensemble network for processing instances of input image data (step 608). Using the ensemble network to process instances of input image data includes processing each instance of input image data through the component sub-networks to generate outputs indicating, e.g., whether certain image elements are present in the instances of input image data, whether an event or action has occurred for in sequences of one or more instances of input image data, etc. For example, when the instances of input data are frames of video from a camera on a vehicle such as a car or truck, using each sub-network to process the instances of input image data may include determining if a road sign, traffic light or traffic light state, and/or another vehicle is shown in sequences of one or more frames of video. The outputs from each component sub-network are then used to compute or determine a unified output from the ensemble network, such as by averaging the outputs from the component sub-networks.

Figure 7:
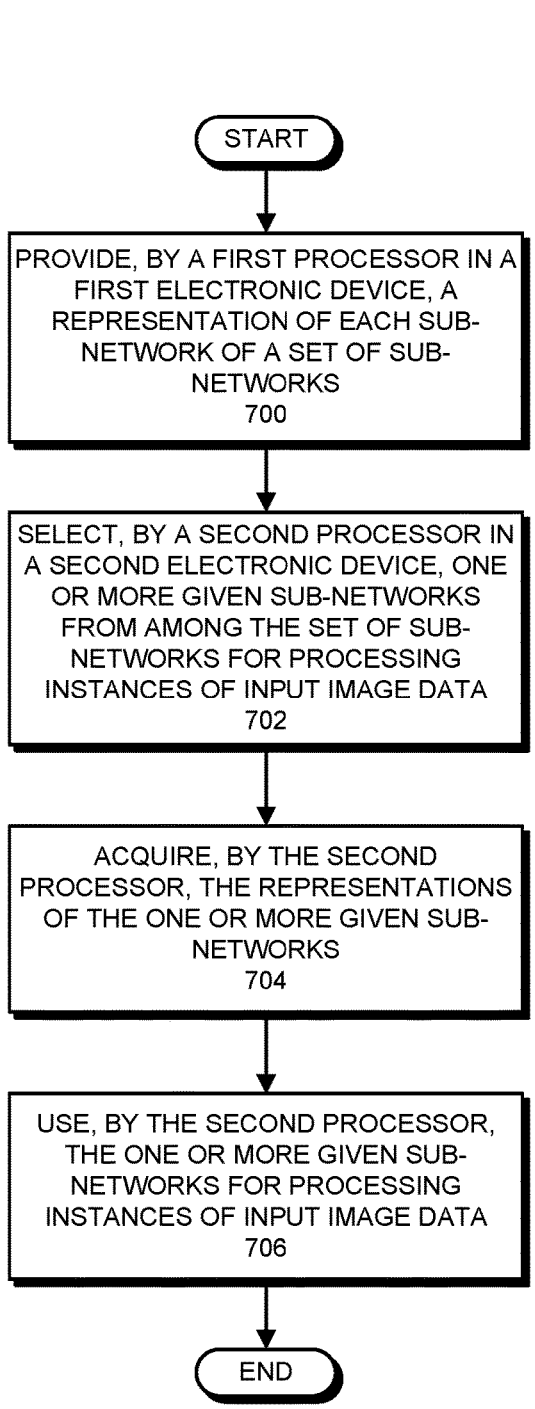
FIG. 7 presents a flowchart illustrating a process for retrieving and using, by a processor in an electronic device, sub-networks provided by another electronic device in accordance with some embodiments.

For the example in FIG. 5, a processor in an electronic device generates and provides individual sub-networks to be used for processing instances of input image data. In some embodiments, the individual sub-networks that are provided by a first processor in a first electronic device are retrieved and used by a second processor in a second electronic device for processing instances of input image data. FIG. 7 presents a flowchart illustrating a process for retrieving and using, by a processor in an electronic device, sub-networks provided by another electronic device in accordance with some embodiments. Note that the operations shown in FIG. 7 are presented as a general example of operations performed by some embodiments. The operations performed by other embodiments include different operations, operations that are performed in a different order, and/or operations that are performed by different entities or functional blocks. In addition, the operations shown in FIG. 7 are performed after the sub-networks have been generated by the first processor in the first electronic device. For example, the first processor in the first electronic device may have performed steps 500-502 of FIG. 5 prior to performing the operations shown in FIG. 7.

Although the example in FIG. 7 is described using individual sub-networks, in some embodiments, similar operations are performed for acquiring and using ensemble networks generated by the first processor in the first electronic device. In other words, in these embodiments, the first processor in the first electronic device generates and provides representations of ensemble networks as shown in steps 600-604 of FIG. 6. The second processor in the second electronic device then acquires the representations of the ensemble networks and uses them following a similar process to that shown in FIG. 7.

The process shown in FIG. 7 starts when the first processor in the first electronic device (e.g., processor 310 in electronic device 302) provides a representation of each sub-network of a set of sub-networks (step 700). As described above, this operation involves the first processor providing the representation for each sub-network (e.g., a file that identifies the properties and characteristics of that sub-network) via a storage medium, a network, and/or another mechanism. For example, the first processor may store the representations of the sub-networks in storage medium 306, may communicate the representations via network 308, etc.

The second processor in the second electronic device (e.g., processor 312 in electronic device 304) then selects one or more given sub-networks from among the set of sub-networks (step 702). For this operation, based on color channel information that is to be processed, the second processor selects the one or more of the sub-networks. For example, when color images using the CMYK color channels are being processed and the sub-networks include the MYK, CYK, CMK, and CMY sub-networks, assuming that the second processor is to process instances of image data without using the C color channel, the second processor selects the MYK sub-network.

The second processor next acquires that representations of the one or more given sub-networks (step 704). How the representations are acquired by the second processor depends on how the representations are provided by the first processor. For example, the second processor may acquire the representations by retrieving the representations from storage medium 306, receiving the representations via network 308, etc.

The second processor then uses the one or more given sub-networks for processing instances of input image data (step 706). Using a given sub-network to process instances of input image data includes processing each instance of input image data through the sub-network to generate outputs indicating, e.g., whether certain image elements are present in the instances of input image data, whether an event or action has occurred for in sequences of one or more instances of input image data, etc. For example, when the instances of input data are frames of video from a camera on a vehicle such as a car or truck, using the sub-networks to process the instances of input image data may include determining if a road sign, traffic light or traffic light state, and/or another vehicle is shown in sequences of one or more frames of video.

Figure 8:
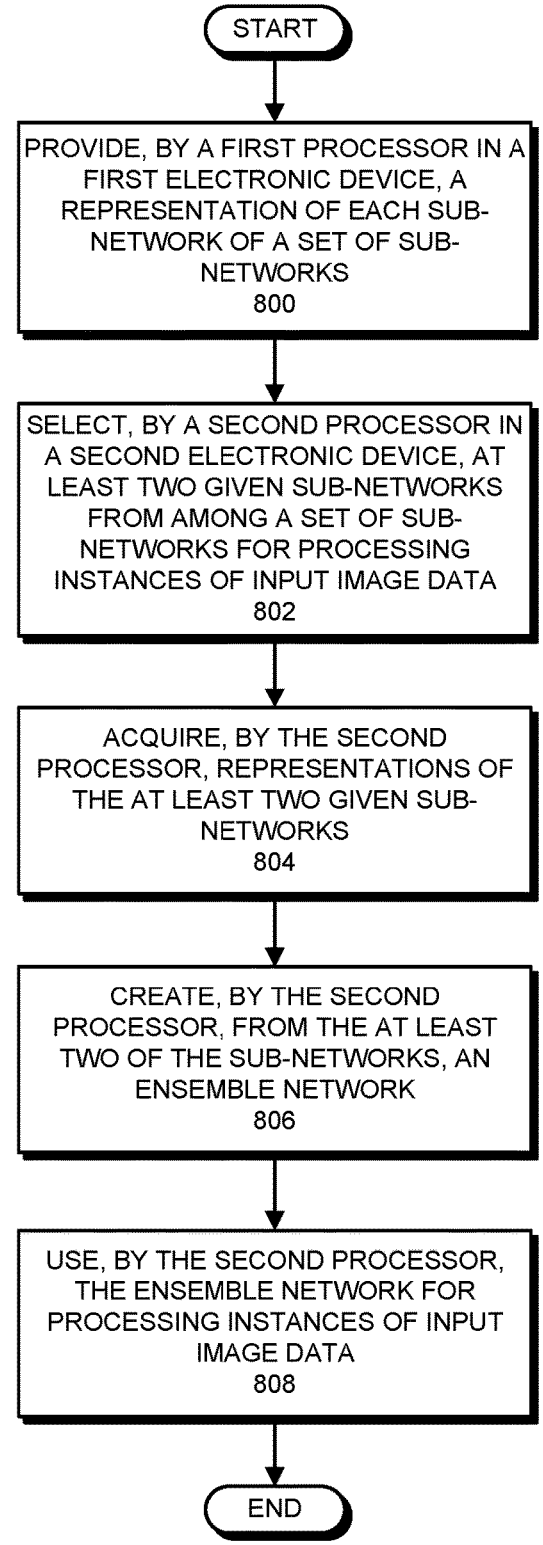
FIG. 8 presents a flowchart illustrating a process for creating, by a processor in an electronic device, ensemble networks from sub-networks provided by another electronic device in accordance with some embodiments.

In some embodiments, instead of the first processor in the first electronic device creating ensemble networks as is described for FIG. 6 above, the first processor simply provides individual sub-networks and the second processor in the second electronic device locally creates ensemble networks for use in the second electronic device from the individual sub-networks. FIG. 8 presents a flowchart illustrating a process for creating, by a processor in an electronic device, ensemble networks from sub-networks provided by another electronic device in accordance with some embodiments. Note that the operations shown in FIG. 8 are presented as a general example of operations performed by some embodiments. The operations performed by other embodiments include different operations, operations that are performed in a different order, and/or operations that are performed by different entities or functional blocks. In addition, the operations shown in FIG. 8 are performed after the sub-networks have been generated by the first processor in the first electronic device. For example, the first processor in the first electronic device may have performed steps 500-502 of FIG. 5 prior to performing the operations shown in FIG. 8.

The process in FIG. 8 starts when the first processor in the first electronic device (e.g., processor 310 in electronic device 302) provides a representation of each sub-network of a set of sub-networks (step 800). As described above, this operation involves the first processor providing the representation for each sub-network (e.g., a file that identifies the properties and characteristics of that sub-network) via a storage medium, a network, and/or another mechanism. For example, the first processor may store the representations of the sub-networks in storage medium 306, may communicate the representations via network 308, etc.

The second processor in the second electronic device (e.g., processor 312 in electronic device 304) then selects at least two given sub-networks from among a set of sub-networks for processing instances of input image data (step 802). During this operation, the second processor chooses the sub-networks that are to be incorporated into the ensemble network. For example, the second processor may choose the sub-networks in accordance with a configuration file or specified set of ensemble networks, based on a request for given ensemble networks from a software application, based on color channels available in particular instances of input image data, etc. For instance, when color images using the RGB color channels are being processed and the sub-networks include the RG, GB, and RB sub-networks, the second processor may select the RG and RB sub-networks so that each of the color channels is processed in the ensemble network.

The second processor next acquires the representations of the one or more given sub-networks (step 804). How the representations are acquired by the second processor depends on how the representations are provided by the first processor. For example, the second processor may acquire the representations by retrieving the representations from storage medium 306, receiving the representations via network 308, etc.

The second processor then creates, from the at least two of the sub-networks, the ensemble network (step 806). Creating the ensemble network includes combining the chosen sub-networks into a neural network that produces a unified output, such as by computing a unified output as a function (e.g., average, maximum, etc.) of the outputs of the component sub-networks within the ensemble network. In some embodiments, during this operation, the second processor wraps or otherwise includes the sub-networks within new ensemble network elements such as instance of input image data processing/forwarding elements, output computation elements, etc. In other words, following step 806, the ensemble network is a standalone neural network that can be used to process instances of input image data through the component sub-networks and produce a unified output.

The second processor then uses the ensemble network for processing instances of input image data (step 808). Using the ensemble network to process instances of input image data includes processing each instance of input image data through the component sub-networks to generate outputs indicating, e.g., whether certain image elements are present in the instances of input image data, whether an event or action has occurred for in sequences of one or more instances of input image data, etc. For example, when the instances of input data are frames of video from a camera on a vehicle such as a car or truck, using each sub-network to process the instances of input image data may include determining if a road sign, traffic light or traffic light state, and/or another vehicle is shown in sequences of one or more frames of video. The outputs from each component sub-network are then used to compute or determine a unified output from the ensemble network, such as by averaging the outputs from the component sub-networks.

In some embodiments, at least one electronic device (e.g., electronic device 302 and/or 304) uses code and/or data stored on a non-transitory computer-readable storage medium to perform some or all of the operations herein described. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compute units, embedded processors, graphics processors (GPUs)/graphics cores, pipelines, accelerated processing units (APUs), functional blocks, controllers, accelerators, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., system 300, electronic devices 302-304, or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A system, comprising:
a first electronic device including a first processor comprising processing circuitry, the first processor configured to:
generate, from a neural network operable for processing a first set of color channels in instances of input image data, a sub-network operable for processing a second set of one or more color channels in instances of input image data, the second set of one or more color channels including fewer color channels than the first set of color channels.

2. The system of claim 1, wherein the first processor is further configured to:
generate, from the neural network, an additional sub-network operable for processing a third set of one or more color channels in instances of input image data, the third set of one or more color channels:
including fewer color channels than the first set of color channels; and
including different color channels than the second set of one or more color channels.

3. The system of claim 2, wherein the first processor is further configured to:
combine the sub-network and the additional sub-network to create an ensemble network.

4. The system of claim 2, wherein the first processor is further configured to:
select the sub-network and/or the additional sub-network for processing instances of input image data based at least in part on one or more color channels to be processed in the instances of input image data.

5. The system of claim 2, further comprising:
a second electronic device including a second processor comprising processing circuitry, wherein:
the first processor is further configured to:
provide a representation of the sub-network and a representation of the additional sub-network to the second processor; and
the second processor is configured to:
use the sub-network and/or the additional sub-network for processing instances of input image data.

6. The system of claim 5, wherein the second processor is further configured to:
combine the sub-network and the additional sub-network to create an ensemble network; and
use the ensemble network for processing instances of input image data.

7. The system of claim 1, wherein generating the sub-network includes:
creating a copy of the neural network from which internal elements for processing at least one color channel in instances of input image data are removed.

8. The system of claim 1, wherein generating the sub-network comprises:
determining at least one color channel to be included in the second set of one or more color channels.

9. The system of claim 1, wherein the first processor is further configured to:
use the sub-network for processing instances of input image data.

10. The system of claim 1, wherein processing instances of input image data comprises generating an output that indicates whether one or more instances of input image data are likely to include specified image elements or features.

11. A method, comprising:
generating, from a neural network operable for processing a first set of color channels in instances of input image data, a sub-network operable for processing a second set of one or more color channels in instances of input image data, the second set of one or more color channels including fewer color channels than the first set of color channels.

12. The method of claim 11, further comprising:
generating, from the neural network, an additional sub-network operable for processing a third set of one or more color channels in instances of input image data, the third set of one or more color channels:
including fewer color channels than the first set of color channels; and
including different color channels than the second set of one or more color channels.

13. The method of claim 12, further comprising:
combining the sub-network and the additional sub-network to create an ensemble network.

14. The method of claim 12, further comprising:
selecting the sub-network and/or the additional sub-network for processing instances of input image data based at least in part on one or more color channels to be processed in the instances of input image data.

15. The method of claim 12, further comprising:
providing a representation of the sub-network and a representation of the additional sub-network from a first processor to a second processor; and
using, by the second processor, the sub-network and/or the additional sub-network for processing instances of input image data.

16. The method of claim 15, further comprising:
combining, by the second processor, the sub-network and the additional sub-network to create an ensemble network; and
using, by the second processor, the ensemble network for processing instances of input image data.

17. The method of claim 11, wherein generating the sub-network includes:
creating a copy of the neural network from which internal elements for processing at least one color channel in instances of input image data are removed.

18. The method of claim 11, wherein generating the sub-network comprises:
determining at least one color channel to be included in the second set of one or more color channels.

19. The method of claim 11, further comprising:
using the sub-network for processing instances of input image data.

20. The method of claim 11, wherein processing instances of input image data comprises generating an output that indicates whether one or more instances of input image data are likely to include specified image elements or features.

* * * * *